United States Patent [19]

Shrader

[11] Patent Number: 4,975,706
[45] Date of Patent: Dec. 4, 1990

[54] RADAR SYSTEM
[75] Inventor: William W. Shrader, Stow, Mass.
[73] Assignee: Raytheon Company, Lexington, Mass.
[21] Appl. No.: 432,281
[22] Filed: Nov. 6, 1989
[51] Int. Cl.[5] .......................... G01S 13/524; G01S 7/28
[52] U.S. Cl. ...................................... 342/160; 342/202
[58] Field of Search ................................ 342/202, 160

[56] References Cited
U.S. PATENT DOCUMENTS

| 2,738,424 | 3/1956 | Mortley | 342/202 |
| 2,782,372 | 2/1957 | Barditch | 342/202 X |
| 2,809,286 | 10/1957 | Philpott et al. | 342/202 |
| 2,983,882 | 5/1961 | Hoover | 342/202 X |
| 4,283,790 | 8/1981 | Clock et al. | 342/202 X |
| 4,774,517 | 9/1988 | Cervone et al. | 342/202 |

Primary Examiner—Gilberto Barrón, Jr.
Attorney, Agent, or Firm—Richard M. Sharkansky

[57] ABSTRACT

A radar system adapted to operate with a selected one of a plurality of pulse repetition intervals to produce a corresponding train of transmitted pulses of radio frequency energy in response to a train of trigger pulses and to receive returns from objects in response thereto, with returns from stationary objects producing signals with the same phase shift relative to the phase of a reference signal. The system includes a switching circuit responsive to a signal representative of the selected one of the pulse repetition intervals, for producing charge controlling signals with time intervals between the charge controlling signals and the trigger pulses being selected in accordance with the selected one of the pulse repetition intervals. A pulse forming network, is provided for storing energy in response to the charge controlling signals and for providing output pulses in response to the trigger pulses. The transmitted pulses of radio frequency energy are produced in response to the output pulses, with signals produced in response to stationary objects having the same phase shift relative to the phase of a reference signal.

9 Claims, 2 Drawing Sheets

RADAR SYSTEM

Background of the Invention

This invention relates generally to radar systems and more particularly to switching circuitry used as pulse modulators for radar systems adapted to produce transmitted pulses with different, or staggered, pulse repetition intervals.

As is known in the art, it is sometimes desirable, as in radar systems, to produce amplified pulses of radio frequency energy. As is also known in the art, in moving target indicator (MTI) radar systems, radar returns produced by reflections of the transmitted pulses from objects are converted into video signals by a phase detector. The video signals are then fed to a canceller. Returns from stationary objects are converted by the phase detector into video signals having the same phase from return to return whereas returns from moving objects are converted into video signals having a different phase from return to return. The rate of change in such phase is related to the velocity of the object. As is known in the art, it is typically desirable to produce a train of transmitted radio frequency pulses having a staggered pulse repetition interval (PRI) in order to remove velocity blind spots. More particularly, as described in my chapter 17 "MTI Radar" of *Radar Handbook*, Editor-In-Chief Merrill I. Skolnick, McGraw-Hill Book Company, New York, 1970, section 17.10 beginning at page 17–38, I point out that the interval between radar pulses may be changed to shift the target velocities to which the MTI radar system is blind. As I pointed out in such chapter, the interval may be changed on either a scan-to-scan or pulse-to-pulse basis. Further, as I describe in section 17.13 beginning at page 17–46 instabilities come from, inter alia, the pulse-to-pulse phase change, if a power amplifier is used, and pulse-to-pulse frequency change, if a power oscillator is used, thereby limiting MTI performance because such phase or frequency changes produce changes in the phase of the video signals produced by the phase detector. As pointed out therein, if the phases of consecutive received pulses, relative to the phase of the coherent oscillator (COHO) in the receiver, differs by say 0.01 radian a limitation of −40 db is placed on the target-to-clutter improvement possible. The 0.01 radian clutter-vector change is equivalent to a target vector 40 db weaker than the clutter superimposed on the clutter. In a pulsed oscillator system, pulse-to-pulse frequency changes result in phase runout during the transmitted pulses. A phase runout of 0.02 radians during the transmitted pulse would then place an average limitation of 40 db on the improvement factor attainable.

Phase or frequency stability, as measured by so called "pushing figures," for various RF tubes is presented in Table 6 of section 7.10 of Chapter 7, "Transmitters" of the above referenced *Radar Handbook* beginning at page 7–64. As pointed out, the especially difficult requirement from the transmitter standpoint is the use of nonuniform interpulse periods, usually called staggered-PRF MTI. That is, when a power amplifier is used, a signal produced by a continuously running radio frequency oscillator is fed to the amplifier and each time a pulse of radio frequency energy is to be transmitted a control voltage is fed to the amplifier to place it in a conduction condition. The phase shift provided by the amplifier is a function of the level of the control voltage. In the case of a power oscillator, a pulse of radio frequency energy is produced by the oscillator in response to a control voltage. The frequency of the radio frequency energy is a function of the level of the control voltage. The most significant source of variation in the level of the control voltage during staggered PRF operation is the variation in high voltage power supply (HVPS) voltage from pulse-to-pulse that results from the nonuniform power drain on the HVPS. As noted, even if the HVPS voltage is held constant, variations in the level of the control signal can occur in other portions of a line-type modulator as a result of nonuniform interpulse. For example, when a radar that uses a pulse forming network (PFN) is operated at other than constant pulse repetition intervals (PRI's) there is a changing phase shift (or frequency shift) in the transmitter output pulses that results from different amounts of energy stored in the PFN at the time of the pulse.

More particularly, the pulse forming network includes a capacitor network. The discharge of the energy stored in such capacitor network, in response to a trigger pulse, produces an output pulse (i.e. the control voltage) for the power amplifier or oscillator. As noted above, in the case of the power amplifier, in response to such control voltage the power amplifier amplifies radio frequency energy from the radio frequency oscillator to produce a pulse of transmitted radio frequency energy, the phase shift provided by the amplifier being a function of the level of the control voltage. As a result of the power oscillator responding to the control voltage, a pulse of radio frequency energy is transmitted, the frequency of the radio frequency energy being a function of the level of the control voltage. The amplitude or level of the control voltage fed to the power amplifier or power oscillator is a function of the energy stored in the capacitor network at the time of the trigger pulse. More particularly, a charge initiating pulse is fed to couple the capacitor network to the power supply to start the charging, or energy storing, process. When the level of the voltage across the capacitor network reaches a predetermined level, a voltage sensing circuit produces a charge terminating signal to electrically decouple the power supply from the capacitor network to stop the charging process. Next, the trigger pulse is supplied to the pulse forming network at a fixed predetermined time, independent of the pulse repetition interval, after the charge initiating pulse to discharge the energy stored in the capacitor network and thereby produce the control voltage for the power amplifier or oscillator i.e., the cathode of a klystron or magnetron, for example.

Two sources of the variation in the amount of energy stored in the pulse forming network, and more particularly in the capacitor network, at the time of the trigger pulse as a result of variations in the pulse repetition interval are: (1) Because of the internal resistance of the power supply the level of the voltage at the input of the pulse forming network, including its output filter, changes with changes in the duty cycle, or pulse repetition interval, of the trigger pulses. There is, in any practical circuit, a delay between the time the energy storing process is told to stop, in response to a charge terminating signal, and the time such storage actually stops. Since, as noted above, the charging rate is a function of the level of the applied voltage (and the level of the applied voltage changes with the duty cycle), the actual charge stored in the pulse forming network at the time the charging process actually ceases is also a function of the duty cycle; (2) In some systems, the time interval between actual cessation of the charging process and the time the next trigger pulse is applied is a function of the pulse repetition interval and the charging rate during such interval, energy is lost in the pulse forming network. As such time interval increases, due to the dielectric absorption in the capacitor network and internal resistance in such network, the amount of charge actually stored in the pulse forming network at the time of the next trigger pulse is therefore a function of the pulse repetition interval.

Because the amplitude of the voltage produced by the pulse forming network is a function of the energy stored in the pulse forming network at the time of the trigger pulse and because, for the three reasons noted above, such energy is a function of the pulse repetition interval, the amplitude of the output pulses (i.e. to control voltages) produced by the pulse forming network will vary with variations in the pulse repetition interval. Furthermore, changes in the amplitude of the output pulses produced at the output of the pulse forming network and fed to the radio frequency amplifier, or oscillator, results in corresponding changes in the transmitted pulses produced at the output of such radio frequency amplifier, or oscillator, with, as noted above, concomitant degradation in MTI performance. In the case of a klystron power amplifier there are various subtle effects, such as changes in differential cathode loading and/or klystron cavity differential heating (or differential cooling) during the interpulse period, and therefore, because of changes in such period (as a result of changes in the pulse repetition interval) changes occur in the relative phase of the transmitted pulses. In the case of a magnetron power oscillator there are various subtle effects, such as cavity heating which change the frequency of the signal produced by the oscillator as a function of the pulse repetition interval.

Summary of the Invention

It is therefore a primary object of the invention to provide a radar system adapted to transmit pulses with different, or staggered, pulse repetition intervals and to produce video signals in response to returns of such transmitted pulses from stationary objects having the same phase shift relative to the phase for a reference signal.

It is a further object of the invention to provide a radar system adapted to transmit pulses with different, or staggered, pulse repetition intervals such pulses having substantially constant phase relative to the phase of a reference signal.

It is still a further object of the invention to provide a radar system adapted to transmit pulses with different, or staggered pulse repetition intervals and to transmit such pulses with the same frequency.

It is still a further object of the invention to provide a high voltage switching circuit adapted to produce pulses of substantially constant amplitude in response to trigger pulses having a wide range of pulse repetition intervals.

In accordance with a feature of the present invention a moving target indicator radar system is provided adapted to operate with a selected one of a plurality of pulse repetiton intervals to produce a corresponding train of transmitted pulses of radio frequency energy in response to a train of trigger pulses and to receive returns from objects in response thereto, with returns from stationary objects producing video signals with the same phase shifts relative to the phase of a reference signal. The system includes a switching circuit, responsive to a signal representative of the selected one of the pulse repetition intervals, for producing charge controlling signals with the time intervals between the charge controlling signals and the trigger pulses being related to the selected one of the pulse repetition intervals. A pulse forming network is provided for storing energy in response to the charge controlling pulses and for producing output pulses in response to the trigger pulses. The transmitted pulses of radio frequency energy are produced in response to the output pulses with the video signals produced in response to returns from stationary objects having the same phase shifts relative to the phase of a reference signal.

In one embodiment of the invention, a radar system is provided adapted to operate with a selected one of a plurality of pulse repetition intervals to produce a corresponding train of transmitted pulses of radio frequency energy in response to a train of trigger pulses, such transmitted pulses having substantially constant phase relative to the phase of a reference signal independent of the selected one of the pulse repetition intervals. The radar system includes a switching circuit, responsive to a signal representative of the selected one of the pulse repetition intervals to be produced by the radar system, for producing charge controlling signals, the time intervals between the charge controlling signals and the trigger pulses being related to the selected one of the pulse repetition intervals. A pulse forming network is provided for storing energy in response to the charge controlling pulses, and for producing output pulses in response to the trigger pulses. A radio frequency amplifier is fed by a source of radio frequency energy, and produces the transmitted pulses of radio frequency energy in response to the output pulses of the pulse forming network with a substantially constant phase relative to the phase of a reference signal.

In another embodiment of the invention, a radar system is provided adapted to operate with a selected one of a plurality of pulse repetition intervals to produce in response to a train of trigger pulses, a corresponding train of transmitted pulses of radio frequency energy with substantially the same frequency independent of the selected one of the pulse repetition intervals. The radar system includes a switching circuit, responsive to a signal representative of the selected one of the pulse repetition intervals to be produced by the radar system, for producing charge controlling signals with the time intervals between the charge controlling signals and the trigger pulses being related to the selected one of the pulse repetition intervals. A pulse forming network is provided for storing energy in response to the charge controlling signals and for producing output pulses in response to the trigger pulses. A radio frequency oscillator produces the transmitted pulses of radio frequency energy in response to the output pulses of the pulse forming network with the same frequency.

In accordance with the present invention, a switching circuit is provided having a pulse forming network for storing energy from a power supply and for producing a train of output pulses from such stored energy in response to a train of trigger pulses, such output pulses having a substantially constant amplitude over a range of different pulse repetition intervals of such train of trigger pulses. Means, responsive to a signal representative of the pulse repetition interval of the trigger pulses are included, for varying the charge stored in the pulse forming network as a function of the pulse repetition interval of the trigger pulses to enable storage in the pulse forming network of a substantially constant amount of energy at the time of each one of the trigger pulses over the range of different pulse repetition intervals.

With such arrangement, the radio frequency pulses produced by the radio frequency amplifier, or oscillator, will have substantially constant phase relative to the phase of a reference signal, or the same frequency, respectively, independent of the pulse repetition interval of the radar system.

BRIEF DESCRIPTION OF THE DRAWINGS

For a more complete understanding of the concept of this invention, reference is now made to the following description taken in conjunction with the accompanying drawings in which.

DESCRIPTION OF THE PREFERRED EMBODIMENT

Figure 1:
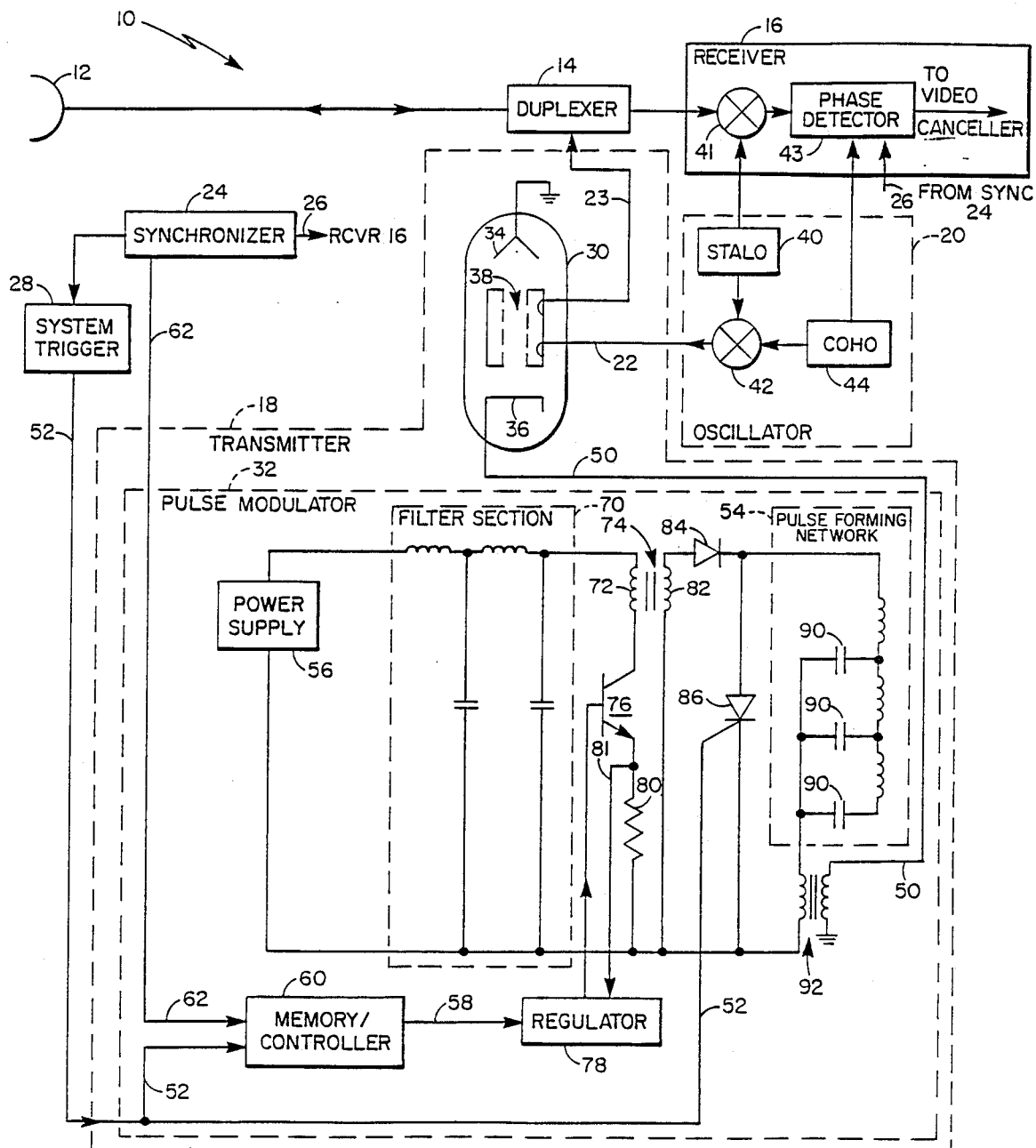
FIG. 1 is a schematic diagram of a radar system according to the invention.

Referring now to FIG. 1, a coherent pulsed Doppler staggered-PRF, moving target indicator (MTI) radar system 10 has been selected to illustrate how the invention might be applied. Thus, radar system 10 is adapted to operate with a selected one of a plurality of pulse repetition intervals. The pulse repetition interval may be changed on either a scan-to-scan, batch-to-batch, or pulse-to-pulse basis. The illustrated radar system 10 includes a radar antenna 12, a duplexer 14, a radar receiver 16, a radar transmitter 18, an oscillator 20, a synchronizer 24, and a system trigger 28, all arranged in a conventional manner as shown whereby, during transmit modes, synchronizer 24 sends signals to the system trigger 28 at the selected one of the pulse repetition intervals, and in response to each one thereof, radio frequency energy produced by oscillator 20 and coupled to the transmitter 18 via line 22, is amplified and pulse modulated by such transmitter 18. The amplified and pulsed modulated radio frequency energy is then coupled to antenna 12 via line 23 and duplexer 14 for transmission. During interleaved received modes, portions of the transmitted energy reflected by objects within the beam of the antenna 12, are received by such antenna 12 and are passed, via duplexer 14, to the radar receiver 16 where they are heterodyned and phase detected with signals produced by oscillator 20 into video signals. The video signals are then resolved into range bins in response to signals fed to the receiver 20 from synchronizer 24 via bus 26 for conventional moving target indicator (MTI) processing. That is, video signals produced by returns from stationary objects have the same phase shift from pulse-to-pulse while video signals produced by returns from moving objects have phase shifts which change from pulse-to-pulse at a rate related to the velocity of the object. It is noted that while the antenna 12, duplexer 14, receiver 16, oscillator 20, synchronizer 24 and system trigger 28 are all of conventional design, the transmitter 18 includes a conventional cathode pulsed, radio frequency power amplifier tube 30, here a conventional klystron, controlled by a pulse modulator 32 according to the invention. As shown, the amplifier tube 30 includes a grounded anode 34, a cathode 36 coupled to pulse modulator 32, and a cavity 38 fed by the oscillater 20, in a conventional manner. Oscillator 20 includes a stable local oscillator (STALO) 40 coupled to, inter alia, mixer 42 along with coherent local oscillator (COHO) 44 to produce a radio frequency signal on line 22 to the input to cavity 38 of klystron 30 in a conventional manner. The outputs of STALO 40 and COHO 44 are also fed to the receiver 16, and in particular to mixer 41 and phase detector 43, respectively. The output in phase detector 43 is coupled to a video canceller (not shown) in a conventional manner, as shown.

Transmitter 18 includes the pulse modulator 32, here a high voltage switching circuit adapted to produce output pulses (i.e., control voltages) on line 50 in response to trigger pulses fed to such modulator 32 on line 52 via system trigger 28. The voltages of the output pulses on line 50 have levels, from trigger pulse to trigger pulse, such that the relative phase of the transmitted pulses on line 23 will be substantially constant relative to the phase of the reference signal on line 22, independent of the pulse repetition interval of such system trigger pulses. The output pulses (i.e., control voltages) produced on line 50 pulse klystron 30 to a conducting condition to thereby produce a pulse of radio frequency energy on line 23 and, hence, enable transmission of such radio frequency pulse via duplexer 14 and antenna 12.

Figure 2:
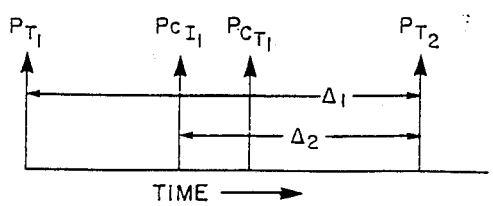
FIG. 2 is a timing diagram of pulses used by the pulse modulator of FIG. 1.

More particularly, the pulse modulator 32 includes a pulse forming network (PFN) 54 for storing energy from a high voltage power supply (HVPS) 56 in response to charge controlling signals, here charge initiating pulses $P_{CI}$ fed to the modulator 32 via line 58 and charge terminating signals $P_{CT}$ produced by regulator 78 in response to a voltage level on line 81. As will be described, pulse forming network (PFN) 54, in response to these charge controlling signals $P_{CI}$, $P_{CT}$, stores energy from the high voltage power supply 56 and produces a train of output pulses on line 50 from such stored energy in response to a train of trigger pulses $P_T$. A memory/controller 60, responsive to a signal fed thereto via line 62 by synchronizer 24 and representative of the pulse repetition interval of the trigger pulses, (and more particularly the time interval $\Delta_1$ between the last trigger pulse $P_{T1}$ and the next suceeding trigger pulse $P_{T2}$ (FIG. 2)) controls the time interval $\Delta_2$ between one of the charge controlling signals, (either $P_{CI}$ or $P_{CT}$) here, the charge initiating pulses $P_{CI}$ on line 58 and the trigger pulses $P_T$ on line 52. The time interval $\Delta_2$ is selected to enable storage, in the pulse forming network 54, of a predetermined constant amount of energy at the time of the trigger pulses $P_T$ such that transmission of pulses of radio frequency energy on line 23 will have substantially constant phase, relative to the phase of the reference signal produced by mixer 42 on line 22, over the range of pulse repetition intervals.

Pulse modulator 32 includes a conventional L-C filter section 70 arranged as shown, and coupled to the output of the power supply 56 in a conventional manner as shown, to produce a substantially constant, dc voltage on the upper end of primary winding 72 of transformer 74. (It should be noted that the level of the voltage at the output of the filter section 70 will be because of, inter alia, the internal resistance of power supply 56, a function of the pulse repetition interval of the trigger pulses). The base electrode circuit of transistor 76 includes a resistor 80. Resistor 80 produces a voltage on line 81 proportional to the current passing through the emitter of transistor 76. The produced voltage is fed to a regulator 78, as shown. Regulator 78 initiates a drive pulse response to each charge initiating pulse $P_{CI}$ on line 58 to turn transistor 76 from a nonconducting condition to a conducting condition. The current passing through the emitter electrode of now conducting transistor 76 is sensed, via the voltage across resistor 80, by regulator 78. When the voltage across resistor 80 reaches a predetermined voltage lever, regulator 78 produces the charge terminating signal $P_{CT}$, and terminates the drive pulse at the base electrode of transistor 76 to thereby change the conducting transistor 76 into a nonconducting mode. Thus, regulator 78 includes a conventional voltage threshold detector, or comparator circuit (not shown). The nonconducting-conducting-nonconducting sequence of transistor 76 causes a pulse to be produced in the primary winding 72 of tranformer 74. Such pulse is inductively coupled to the secondary winding 82 of transformer 74, and thus, the energy in such pulse passes through diode 84 for storage in the shunt connected capacitors 90 of pulse forming network 54.

It should be noted that because the charging rate of the capacitors 90 is a function of the level of the voltage fed to such capacitors and since, as noted above, the level of such voltage is a function of the voltage produced at the output of filter section 70 (which is a function of the pulse repetition interval), the rate of charge of such capacitors 90 is likewise a function of the pulse repetition interval. Further, it should be noted that because there is a small delay between the time that the threshold voltage is sensed and the time transistor 76 is actually placed in a nonconducting condition, additional charging occurs. Since the rate of charging is a function of the level of the voltage at the time the voltage level is removed, and such is a function of the pulse repetition interval, the additional charging stored by the capacitors 90 is also a function of the pulse repetition interval. In response to the trigger pulse ($P_T$) silicon controlled rectifier (SCR) 86 conducts causing the energy stored in the capacitors 90 to discharge and thus induce an output voltage on line 50 via transformer 92. Memory/controller 60 adjusts the time interval between the charge controlling pulse, here the charge initiating pulse $P_{CI}$ produced by regulator 78, relative to the time of the next trigger pulse $P_T$ to be produced by the system trigger 28 so that, if there were no subtle effects from the power amplifier 30 (such as, for a klystron tube, differential cathode loading and/or klystron cavity differential heating (or differential cooling) during the interpulse period) the amount of energy stored in capacitors 90 at the time of each trigger pulse $T_P$ is substantially constant (and hence, the voltage level of the output pulses on line 50 will be constant) over the range of operating pulse repetition intervals of such trigger pulses. As will be noted below, however, that because of these subtle effects associated with the power amplifier 30, the level of the energy stored by such capacitors 90 is such that the transmitted pulses on line 23 have substantially constant phase, relative to the phase of the reference signal produced by mixer 42, independent of the pulse repetition interval.

Memory/controller 60 includes a conventional read only memory (not shown). The read only memory (not shown) is addressed by the signal on line 62. The signal on line 62 is produced by synchronizer 24 and is representative of the selected one of the plurality of pulse repetition intervals producible by the radar system 10. More particularly, such signal on line 62 is a digital word representative of a time interval $\Delta_1$, (FIG. 2) between the current trigger pulse $P_{T1}$ and the next trigger pulse $P_{T2}$. Each one of such digital words addresses a corresponding one of a plurality of the locations of the read only memory. Stored in each one of such locations is a digital word representative of the time interval $\Delta_2$ (FIG. 2) between the next trigger pulse $P_{T2}$ and the charge control pulse, here the charge initiating pulse $P_{CI1}$, such that either the energy stored by capacitors 90 at the time of trigger pulse will be constant (as in the case where pulse repetition interval variation on the above-mentioned subtle effects can be neglected in the power amplifier 30) or, the energy will be such that the phase of the signal produced on line 23 will be constant relative to the phase of the signal on line 22, independent of the pulse repetition interval (as in the case where such subtle effects are to be compensated). This stored time $\Delta_2$ interval is determined as a result of a calibration procedure. More particularly, for each one of the plurality of time intervals (over the range of permissible time intervals for the radar system) between successive trigger pulses an experimental determination is made of the time interval $\Delta_2$ between the charge initiating pulse $P_{CI1}$ and the next trigger pulse $P_{T2}$ such that the phase of the radio frequency pulse produced on line 23 relative to the phase of the signal on line 22 is substantially constant over the range of pulse repetition intervals. More particularly, for each one of the permissible pulse intervals between successive trigger pulses, the phase of the radio frequency energy produced by oscillator 20 on line 22 is compared with the phase of the radio frequency pulse produced on line 23. For each of the plurality of possible time intervals $\Delta_1$ (FIG. 2) between successive trigger pulses $P_{T1}$, $P_{T2}$ (FIG. 2) the time interval $\Delta_2$ (FIG. 2) between the next one of the trigger pulses, $P_{T2}$, and the charge initiating pulse $P_{CI1}$ is varied so that the phase between the signal on line 23 and the signal produced on line 22 by oscillator 20 is constant over the plurality of possible time intervals between successive trigger pulses. The determined time intervals $\Delta_2$ (FIG. 2) for each one of the plurality of possible time intervals $\Delta_1$ (FIG. 2) are stored in the read only memory (not shown) of the memory/controller 60.

Figure 3:
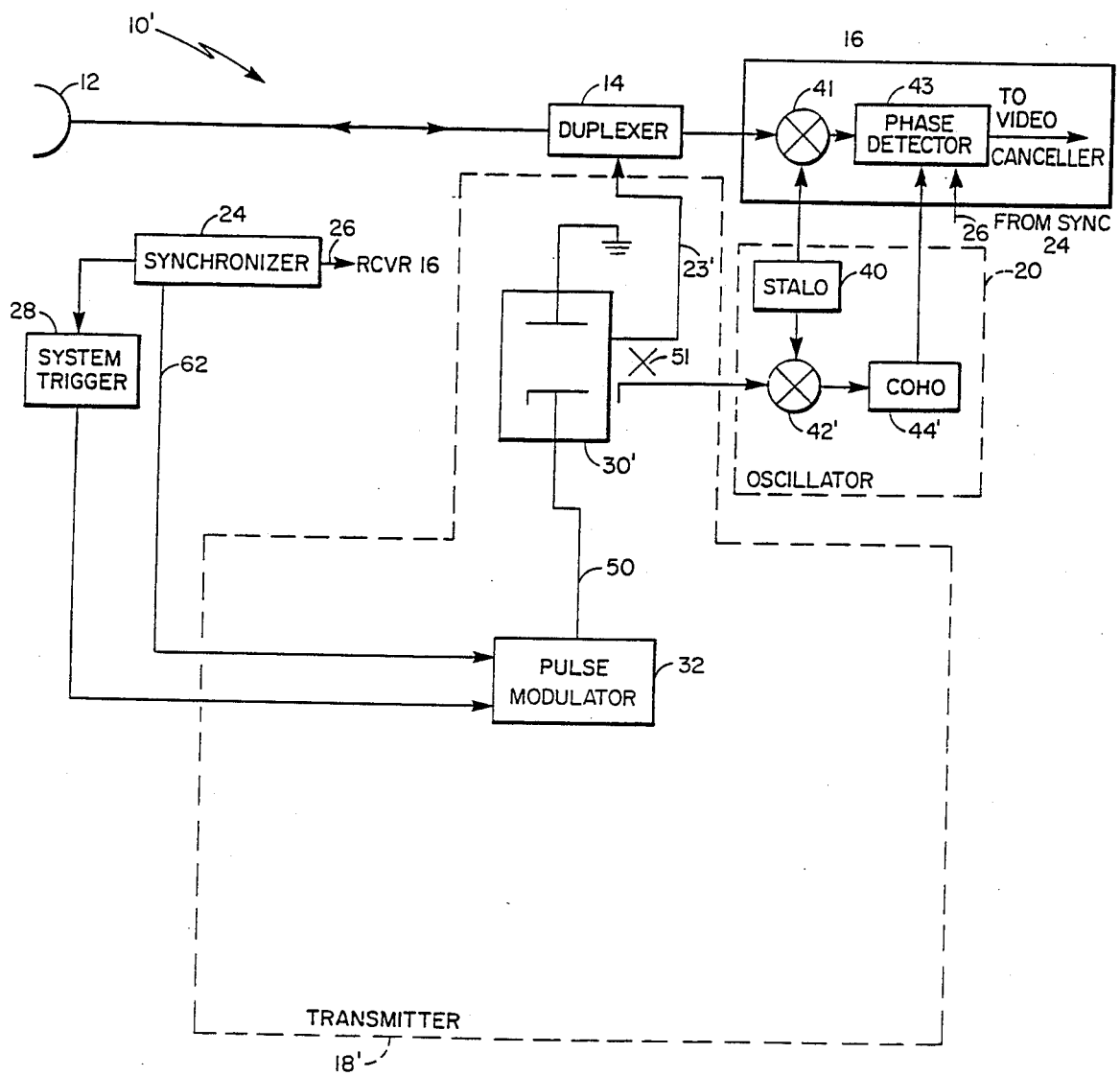
FIG. 3 is a schematic diagram of a radar system according to an alternate embodiment of the invention.

Referring now to FIG. 3 a radar system 10' is shown to again include a radar antenna 12, a duplexer 14, a radar receiver 16, a radar transmitter 18', a synchronizer 24, and a system trigger 28 all arranged as shown in a conventional manner. Here, however, transmitter 18', while including the pulse modulator 32 shown and described in detail in connection with FIG. 1, includes a high power radio frequency energy oscillator, here a magnetron 30'. The magnetron 30' is pulsed on and off in response to the pulse (i.e., control voltage) produced by the pulse modulator 32 on line 50. The radio frequency pulse produced by the magnetron 30' in response to pulses produced on line 50 is fed, via line 23', to the duplexer 14. A portion of such produced pulse is fed, via directional coupler 51, to mixer 42'. Also fed to mixer 42' is a signal produced by STALO 40. The output of mixer 42' is fed to COHO 44'. The output of STALO 40 is also fed to mixer 41 of radar receiver 16. The output of mixer 41, along with the output of COHO 44', are fed to phase detector 43, the output of such phase detector 43 being a video signal which is fed to a video canceller (not shown) in a conventional manner. Here the radar system 10' is calibrated so that over the range of operating pulse repetition intervals, a value $\Delta_2$ (FIG. 2) is stored in the memory/controller 60 of pulse modulator 32 such that magnetron 30' produces on line 23' pulses of the same frequency for each one of the pulse repetition intervals in the range thereof. In this manner, for each pulse repetition interval selected, the phase of the video signal produced by the phase detector 43 in response to returns from stationary objects will be constant relative to the phase of the signal fed to the phase detector 43 by COHO 44.

Having described the preferred embodiment of the invention it will now be apparent to one of skill in the art that other embodiments incorporating its concepts may be used. For example, instead of varying the time of the charge initiating pulse $P_{CI}$ relative to the time of the next succeeding trigger pulse, one could vary the time the charging process is stopped relative to the next trigger pulse (i.e. varying the time interval between the charge terminating signal, $P_{CT1}$, and $P_{T2}$ in FIG. 2) instead of sensing the voltage across resistor 80. That is, the charge control pulse can be used to change the terminating pulse by changing the voltage threshold of the voltage comparator (not shown) in regulator 78 (FIG. 1) as a function of pulse repetition interval. Further, when the dielectric absorption in the capacitors 90 are insufficient to compensate for the phase shifts, a bleed-down resistor may be put in parallel with these capacitors 90 so that changing the charge initiating timing will provide more compensation for the pulse-to-pulse phase shifts of the transmitter output. It is felt therefore, that this invention should not be restricted to the disclosed embodiment but rather should be limited only by the spirit and scope of the appended claims.

What is claimed is:

1. A moving target indicator radar system, adapted to operate over a predetermined range of pulse repetition intervals, for producing, in response to a train of trigger pulses a corresponding train of transmitted pulses of radio frequency energy and for receiving returns from objects in response thereto, with returns from stationary objects producing signals with the same phase shift over the range of pulse repetition intervals, comprising:

a pulse forming network means for storing energy in response to charge controlling signals and for producing output pulses in response to the trigger pulses;

means for producing the transmitted pulses of radio frequency pulses in response to the output pulses; and means for storing data representative of time intervals between the charge initiating signals and the trigger pulses, such data being obtained from experimentally determined variations in the transmitted pulses over the range of pulse repetition intervals, such time intervals being selected to remove such variations over the range of pulse repetition intervals, and for producing the charge initiating signals from such stored data in response to the operating pulse repetition interval of the radar system and the trigger pulses.

2. A moving target indicator radar system, adapted to operate over a predetermined range of pulse repetition intervals, for producing, in response to a train of trigger pulses, a corresponding train of transmitted pulses of radio frequency energy and for receiving returns from objects in response thereto, with returns from stationary objects producing signals with the same phase shift over the range of pulse repetition intervals, comprising:

a pulse forming network means for storing energy in response to charge controlling signals and for producing output pulses in response to the trigger pulses;

means, including a radio frequency amplifier fed by a reference signal, for producing the transmitted pulses of radio frequency pulses in response to the output pulses; and means for storing data representative of time intervals between the charge initiating signals and the trigger pulses, such data being obtained from experimentally determined variations in the phase between the output pulses and the reference signal over the range of pulse repetition intervals, such time intervals being selected to maintain such phase constant over the range of pulse repetition intervals, and for producing the charge initiating signals from such stored data in response to the pulse repetition interval of the radar system and the trigger pulses.

3. A moving target indicator radar system, adapted to operate over a predetermined range of pulse repetition intervals, for producing, in response to a train of trigger pulses, a corresponding train of transmitted pulses of radio frequency energy, such radar system comprising:

a pulse forming network means for storing energy in response to charge controlling signals and for producing output pulses in response to the trigger pulses;

means, including a radio frequency oscillator, for producing the transmitted pulses of radio frequency pulses in response to the output pulses; and means for storing data representative of time intervals between the charge initiating signals and the trigger pulses, such data being obtained from experimentally determined variations in the frequency of the transmitted pulses over the range of pulse repetition intervals, such time intervals being selected to maintain such frequency constant over the range of pulse repetition intervals, and for producing the charge initiating signals from such stored data in response to the pulse repetition interval of the radar system and the trigger pulses.

4. The radar system recited in claim 1 wherein the data storing means comprises a digital memory.

5. The radar system recited in claim 4 wherein the digital memory comprises a read only memory.

6. The radar system recited in claim 1 wherein the data storing means comprises a digital memory.

7. The radar system recited in claim 6 wherein the digital memory comprises a read only memory.

8. The radar system recited in claim 3 wherein the data storing means comprises a digital memory.

9. The radar system recited in claim 8 wherein the digital memory comprises a read only memory.

* * * * *